United States Patent Office

3,449,312
Patented June 10, 1969

3,449,312
POLYMERIZATION WITH ALUMINUM-
IODINE TYPE CATALYSTS
Robert J. Minchak, Parma Heights, Ohio, assignor to
Goodrich-Gulf Chemicals, Inc., Cleveland, Ohio, a corporation of Delaware
No Drawing. Continuation-in-part of application Ser. No.
152,076, Nov. 13, 1961. This application July 6, 1965,
Ser. No. 469,932
Int. Cl. C08d 3/08, 1/26
U.S. Cl. 260—94.3    9 Claims This invention relates to the production of polymeric materials from butadiene. More particularly, this invention relates to the polymerization of butadiene-1,3 to form materials having a relatively high cis-1,4 content.

This application is a continuation-in-part of application Ser. No. 152,076, filed Nov. 13, 1961 and now abandoned.

Owing to recent discoveries in the field of organometallic type catalysis, it has become possible to polymerize various monomeric substances in definite stereoregulated configurations. It is now possible for instance to produce from monomeric butadiene-1,3 a polymeric product having a relatively high cis-1,4 content. Such material has wide application in many fields, including the manufacture of truck and automobile tires, due to its low hysteresis-high rebound characteristics, good flex cracking resistance, excellent aging properties, and superior tread wear resistance up to double or more that of natural rubber.

Several catalyst systems have in the past been proposed for producing a polymeric butadiene high in cis-1,4 structure. Among the systems which have thus been proposed, is a polymerization process employing a titanium tetrahalide such as titanium tetrachloride or titanium tetrabromide, in conjunction with an alkyl aluminum compound. While a polymer can be formed through the use of such a catalyst, the resulting product frequently has a high concentration of undesirable gel, i.e., cross linked material, as well as a substantial amount of trans structure present. In addition, the butadiene-1,3 monomer is polymerized in the 1-2 as well as the 1-4 form. Many of the properties which make the cis-1,4 polybutadiene commercially valuable tend to disappear as the trans content and the amount of 1,2 polymer increases; however, and in addition, the presence of gel interferes with the incorporation into the polymer of necessary compounding ingredients such as curing agents, reinforcing fillers and the like.

Another catalyst system which has been suggested makes use of an alkyl aluminum compound together with titanium tetraiodide. Although butadiene polymers containing appreciable amounts of the cis-1,4 structure can be produced by such a system, titanium tetraiodide is somewhat unstable, and because of this and certain other of its physical characteristics, it is frequently inconvenient to work with in a manufacturing process. Furthermore, titanium tetraiodide is a relatively expensive catalyst ingredient.

Now a method has been found, however, by which a polymer almost totally free of gel formation may be produced from 1,3-butadiene. The polymer formed is substantially all of the 1,4 type and is relatively high in the cis configuration. In addition, the structure of the polymer can be altered, if desired, by varying polymerization conditions such as reaction temperature, the quantity of catalyst employed and the like.

In accordance with this invention, monomeric butadiene-1,3 can be polymerized to form a polymer having a relatively high cis-1,4 structure by a process comprising conducting the polymerization in the presence of a catalyst which includes an iodine source; a titanium halide in which the halide is selected from the group consisting of titanium fluoride, titanium chloride and titanium bromide; and a hydrocarbon aluminum compound.

The process of the invention is conveniently carried out by combining iodine, or a compound containing iodine, with a hydrocarbon aluminum compound and a titanium halide in a reaction vessel maintained in a clean, dry, oxygen-free condition. If preferred, the catalyst components may be incorporated with an inert polymerization medium and the polymerization carried out therein. The monomeric-1,3 butadiene is introduced into the reaction mixture, and polymerization is continued until the degree of polymerization desired has been obtained. A catalyst deactivating agent is then combined with polymerization mixture to destroy catalytic activity, and the polymer is subsequently separated from the bulk of the extraneous processing constituents. Following separation, the polymer is washed to eliminate catalyst residues and dried.

Hydrocarbon aluminum compounds suitable for use in the process have the general structure $R_2AlR'$ in which $R'$ is a hydrocarbon radical preferably an alkyl radical, and R may be additional $R'$ groups, hydrogen atoms, and combinations of any of them.

Apparently, the arrangement and number of carbon atoms contained in the hydrocarbon portion of the hydrocarbon aluminum is relatively unimportant; consequently, a great many compounds may be employed for catalytic purposes such as, for instance, trimethyl aluminum, triethyl aluminum, tripropyl aluminum, tributyl aluminum, tripentyl aluminum, trihexyl aluminum, triheptyl aluminum, tri-n-octyl aluminum, isomers of the preceding, and many other materials including aluminum compounds having aryl containing substituents.

Any of various hydrides including substances such as dimethyl aluminum hydride, diethyl aluminum hydride, dibutyl aluminum hydride, dipentyl aluminum hydride, dihexyl aluminum hydride, dioctyl aluminum hydride and the like may also be employed as catalyst ingredients, as well as mixtures of hydrides, isomers of any of the preceding, and trialkyl compounds. Alkyl aluminum halides may also be incorporated in the reaction mixture if desired. Advantageously, the aluminum compound selected is one which is appreciably soluble in the reaction mixture.

Titanium halides, that is binary compounds of titanium and halogen such as titanium fluoride, titanium bromide and titanium chloride, all have been found suitable as catalyst components for purposes of the invention; however, certain advantages have been found in the use of titanium chloride as a catalyst component, and its use is preferred. Inasmuch as certain of these halides have a tendency, after standing for prolonged periods, to form protective surface films which interfere with optimum catalytic activity, the use of freshly prepared catalyst is desirable.

Any of a great variety of compounds may be employed to supply the iodine necessary for the catalyst. A suitable iodine source may, for instance, be found in such compounds as alkyl iodides, i.e., methyl iodide, ethyl iodide, methylene iodide, iodoform and the like, as well as in aluminum iodide compounds of the formula $R_xAlI_{3-x}$ where R is a hydrocabon group, preferably an alkyl group, and $x$ is a a number 0 through 2, including compounds such as, for example, aluminum iodide, i.e., $AlI_3$, dimethylaluminum iodide, diethylaluminum iodide, diisobutylaluminum iodide, di-2-ethylhexyl aluminum iodide, methylaluminum, diiodide, ethylaluminum diiodide, isobutylaluminum diiodide, and the like. Free iodine is also operable for the purposes of the invention. Certain advantages have been found in the use of compounds containing iodine, especially in the use of hydrocarbon iodo aluminums, and the use of such materials is particularly suited to the practice of the invention. Iodine containing materials having appreciable solubility in the reaction mixture are singularly adapted to use as catalyst components, and for this reason, some iodine componuds are preferred over others in particular reaction mixtures. Appropriate selection of the reaction medium permits a wide variety of iodine containing materials to be effectively used, however.

The relative amounts of catalyst ingredients may be varied within a wide range although it is preferable that they be maintained within certain limits in order to assure the formation of the more valuable polybutadiene polymers. While it is of advantage, therefore, to maintain the aluminum constituent in the catalyst present in an amount such that on a molar basis it constitutes at least about 3 times the titanium content, greater advantages have been found in utilizing a titanium to aluminum ratio of from about 1 to 3 to about 1 to 500, and in the preferred embodiment of the process, the ratio is maintained at from about 1 to 5 to about 1 to 350.

Similarly, it has been found advantageous to employ a sufficient quantity of iodine in the catalyst such that on a molar basis it amounts to at least about twice the amount of titanium present. It is even more desirable, however, to use a ratio of iodine to titanium of from about 2 to 1 to about 500 to 1, and particularly good results have been obtained when the ratio is maintained at from about 3 to 1 to about 250 to 1.

The amount of aluminum used in the catalyst is normally adjusted so as to be, on a molar basis, slightly in excess of the quantity of iodine employed, and while certain advantages have been found in using a ratio of from about slightly greater than 1 to 1 to about 500 to 1, a ratio of from about 2 to 1 to about 250 to 1 is preferred.

The quantity of a catalyst actually employed will depend on the amount of catalyst destroying impurities present (see infra) in the reaction mixture as well as on other considerations such as the molecular weight of the polymer desired—the molecular weight varying inversely with the amount of catalyst used. Generally, however, sufficient catalyst is added so that at least about 0.005 gram millimoles of the titanium constituent is available for catalysis in the reaction mixture for every 100 grams of butadiene present, and a range of from about 0.02 to about 10 gram millimoles per 100 grams of butadiene is preferred.

Considerable latitude may be exercised in choosing the order of addition of catalyst components; however, certain substances such as oxygen, water, and materials containing active hydrogen ions have the ability to react with and, consequently, to impair the catalytic activity of certain of the catalyst components such as, for insance, the hydrocarbon aluminum material. The addition, initially, of the hydrocarbon aluminum material to the polymerization system is sometimes desirable, therefore, for the purpose of scavenging impurities and assuring that the desired amount of catalyst subsequently added will be fully operable. In the absence of an iodine source, it has also been found preferable to avoid the simultaneous presence of monomer together with the hydrocarbon aluminum compound and the titanium halide since, as previously mentioned, this can act as a catalyst system to produce substantially inferior polymeric product.

It is possible to carry on the polymerization reaction in the absence of any inert polymerization medium; however, the use of such material provides a convenient method for controlling the temperature of the reaction, as well as the reaction rate, and for these and other reasons, its use is preferred. Many types of substances such as hydrocarbons and the like which remain inert during the course of the reaction are suitable for the purposes of the invention although certain advantages have been found in the use of materials having an appreciable solubilizing effect on the catalyst components. Among suitable substances are relatively low molecular weight saturated compounds such as, for example, butane, pentane, and the like; however, unsaturates such as, for instance, butene-1, butene-2, and mixtures containing unsaturated compounds are preferred. Superior results have been obtained when the polymerization medium is comprised of substantial amounts of aromatic materials such as benzene, xylene, toluene, and similar compounds either alone or in mixtures with other substances.

In carrying out the process of the invention, it has been discovered that the temperature at which the polymerization is conducted has a pronounced effect on the type of of polymeric material produced. Indeed, it is possible by appropriate control of the polymerization temperature to vary both the molecular weight and the cis-1,4 content of the polymer through a relatively wide range. While products suitable for use as extenders for natural and styrene-butadiene type rubbers can be made when the polymerization is carried out at temperatures above 50° C., a polymer having clearly superior properties results when the polymerization is performed at below about 50° C., and particularly good polymers result when the polymerization is conducted at below about 25° C. In the preferred practice of the invention; however, the polymerization reaction is controlled at from about 10 C. to about −10° C.

The polymerization reaction may be accomplished in either a continuous or batch fashion. The batch polymerization procedure may be achieved, for instance, by combining the reaction ingredients in a substantially clean, dry, oxygen-free reaction vessel maintained under an inert atmosphere, such as nitrogen, argon, helium, hydrocarbon vapors or the like. While various methods of addition may be employed, one method which has been found convenient comprehends the addition of the inert polymerization medium, if any; monomer; and the hydrocarbon aluminum compound to the reactor as a first step. Following this, the iodine source can be added, alone—or in a solution of hydrocarbon solvent, followed by the titanium halide. It is sometimes preferable to add the monomeric butadiene-1,3 by increments in order to control the polymerization at a slower rate and facilitate control of the reaction temperature. When the reactor is equipped with a reflux type condenser, condensation and subsequent return to the reactor of polymerization medium or monomer assists greatly in obtaining accurate control of the polymerization temperature.

The batch process, one variation of which has been described above, produces a high quality product; however, use of a continuous process is sometimes desirable. Continuous operation can be achieved by the continual addition to a reactor vessel of polymerization ingredients including monomer, a polymerization medium—if preferred, and catalyst, coupled with the constant removal of the polymerization mixture for the purpose of catalyst deactivation, polymer separation and purification. When this type of process is employed, it is possible to attain additional control of the polymerization by adding one or more of the catalyst ingredients separately to the reaction mixture.

Irrespective of whether a batch or a continuous type reaction procedure is followed, it is normally possible to achieve a conversion of at least about 90% of the butadiene-1,3 monomer to the desired polymeric form in a reaction residence time of from about ½ to 24 hours.

When the polymerization has progressed to the proper degree, the reaction may be arrested by deactivating the catalyst in the reaction mixture. Such a result may be accomplished by introducing into the polymerization mixture substances such as oxygen, water, or materials containing active hydrogen ions. While water is admirably suited to the purpose, inasmuch as it is inexpensive and easily handled, organic substances containing active hydrogen ions are especially well adapted for the purpose since they are normally completely miscible with the reaction mixture and capable of rapid deactivation of the catalyst. Substances containing active hydrogen ions, which are also soluble in water, such as alcohol, acetone, tetrahydrofuran, and the like are particularly useful for the purpose since they are readily removed from the polymeric product along with the catalyst residues by means of a water wash.

To halt the polymerization reaction, catalyst-deactivating materials may be added directly to the reaction mixture, or alternatively, the reaction mixture may itself be dispersed in water or other catalyst reactivating substance. When the polymer is substantially insoluble, and the polymerization medium substantially soluble in the deactivator, termination of the reaction in the latter manner also accomplishes precipitation of the polymer from the reaction mixture. Following aggregation of the polymer, either through addition of the reaction mixture to a substance having little solubility for the polymer, or through other means such as, for instance, by solvent evaporation, the polymer is separated and washed to remove residual traces of inactivated catalyst, before being dried. Polybutadiene rubbers containing a high proportion of the cis-1,4 structure are exceptionally stable to heat and can be dried at the comparatively high temperatures of, for example, from about 80° to 250° F., or higher. The drying process can be performed in a wide variety of equipment such as hot-air driers, vacuum driers, extruder-driers or the like.

It is frequently desirable to incorporate antioxidants or other materials into the polymeric product, and this may readily be done by introducing the material into the reaction mixture either prior to, or following precipitation of the polymer. Antioxidants of the type commonly utilized in natural or styrene-butadiene rubbers are admirably suited to the purpose, and normally, the addition of such material in amounts of from about 0.5% to about 2% by weight, adequately protects the polymer during drying, storage and shipment.

The following examples, while not intended to be limiting in nature, are illustrative of the invention.

EXAMPLE I

After a polymerization vessel has been thoroughly cleaned; dried and purged of oxygen, the following materials are added under an inert-atmosphere of substantially dry, oxygen-free nitrogen, in the amounts and order indicated: 735 grams of benzene; 100 grams of butadiene-1,3; 0.585 gram of triisobutyl aluminum; 0.367 gram of iodine; and 0.079 gram of titanium tetrachloride.

The rate of reaction is so high that in order to control the exotherm of the reaction, initially only a small amount of the butadiene is charged to the polymerization reactor. The mixture is maintained at a temperature of about 23° C. and agitated while the balance of the butadiene is added at approximately the rate at which it is consumed by the polymerization reaction. Three to four hours after the last of the butadiene has been added, the reaction is found to have subsided, and about 5% by volume of dry acetone is added to the reactor to deactivate the catalyst. Antioxidant dispersed in acetone is also incorporated in the reaction mixture at this point, and the mixture is slowly pumped into a pressure vessel, equipped with a condenser and stirrer, containing hot water. The solvent, acetone and unreacted monomeric butadiene are vaporized by this procedure, and the polymer is precipitated in the form of a slurry of solid rubber crumbs. The slurry is subsequently filtered, washed with hot water, and the crumbs are dried in a hot-air dryer.

A conversion of about 90% is obtained by the described process, and the polymer formed has a Mooney Viscosity of 68 (ML–4–212° F.); an inherent viscosity (0.2 gm. of polymer per 100 ml. of toluene) of 2.7; and a structure in which 92% of the monomeric butadiene units are joined cis-1,4; approximately 4% joined 1,2; and the remainder are joined trans-1,4.

EXAMPLE II

The effect on the molecular weight of the polybutadiene which is produced by variations in the concentration of catalyst is readily apparent from the following experiments. In these runs, the butadiene-1,3 is polymerized at a temperature of about 25° C. utilizing the procedure and recipe of the preceding Example I with the exception of the total catalyst concentration. The concentration of catalyst components in the table below appears as gram millimoles per 100 grams of butadiene.

| Triisobutyl aluminum | Iodine | Titanium tetrachloride | Monomer Conversion, percent | Inherent viscosity | Cis-1,4, percent |
|---|---|---|---|---|---|
| 5.6 | 1.4 | 0.36 | 100 | 1.5 | 89 |
| 2.8 | 0.7 | 0.18 | 100 | 2.1 | 92 |
| 1.4 | 0.35 | 0.09 | 100 | 3.4 | 87 |
| 6.5 | 2.8 | .56 | 100 | 1.8 | 87 |
| 3.2 | 1.4 | .28 | 100 | 3.0 | 89 |
| 1.6 | 0.7 | .14 | 100 | 4.6 | 90 |

It is interesting to observe that the polymerizations, which were continued for 16 hours, result in less than 4% of the 1,2 structure. From the results, it is clear that polymeric molecular weight is an inverse function of the total catalyst concentration.

EXAMPLE III

The influence of the temperature at which reaction is conducted on the polymerization is illustrated by the following series of experiments in which the temperature is controlled at various temperatures through the range of from 0° C. to 85° C.

In each of the experiments, a clean, dry reactor is charged with 182 grams of butane; 548 grams of benzene; 100 grams of butadiene; 0.585 gram of triisobutyl aluminum; 0.367 gram of iodine; and 0.079 gram of titanium tetrachloride. The polymerization is conducted in the manner of Example I, and the temperature is controlled by the cooling obtained through refluxing butane. After about 3 ot 5 hours, the polymerizations result in products having inherent viscosities of from 2.0 to 2.9, and conversions of from 90 to 100% are realized. The cis-1,4 content of the polymer formed in each of the experiments as shown by infra red examination, is as follows:

Reaction temperature, ° C.:                Percent cis-1,4
    0 ------------------------------------------ 96
    5 ------------------------------------------ 95
   25 ------------------------------------------ 90
   35 ------------------------------------------ 87
   50 ------------------------------------------ 81
   68 ------------------------------------------ 65
   85 ------------------------------------------ 50

As may be observed from the preceding table, the cis-1,4 content of the butadiene polymer produced by the process of the invention is an inverse function of the temperature at which the reaction is carried out. A convenient method for control of the type of polymer produced is, therefore, available to the practitioner of the process through suitable adjustment of the temperature at which the reaction is conducted. Highly desirable properties such as low heat generation and high abrasion resistance are obtained with polymers containing a relatively high cis-1,4 content; however, other products suitable for use as extenders in synthetic and natural elastomers may also be produced by appropriate control of the temperature.

EXAMPLE IV

The relationship which the level of titanium halide has to the structural characteristics of the polymer produced by the process may be observed from the following series of experiments. The reaction mixture in each of the experiments, which are conducted in a manner similar to that employed in the case of Example III, consists of 3.28 gram millimoles of triisobutyl aluminum per 100 grams of butadiene; 0.72 gram millimoles of iodine per 100 grams of butadiene; and the concentration of titanium tetrachloride appearing in the table (infra). The concentration of butadiene used in the polymerization, carried out at 20° C. for about 16 hours in a reaction medium containing 33% by volume of butane in benzene, is approximately 15% by weight. The results of the experiments are tabulated as follows:

| Titanium tetrachloride (millimoles/ 100 gm. butadiene) | Conversion, percent | Cis-1,4 content, percent | Trans-1,4 content, percent | 1,2 content, percent | Inherent viscosity |
| --- | --- | --- | --- | --- | --- |
| 0.75 | 80 | 72 | 24 | 4 | 1.07 |
| 0.375 | 100 | 88 | 8 | 4 | 2.20 |
| 0.188 | 75 | 93 | 3 | 4 | 2.19 |

From the table, it can be seen that high ratios of titanium to aluminum favor the formation of the valuable cis-1,4 type product; thus when using a molar ratio of titanium/aluminum of about 1:4, the cis-1,4 content is rather low whereas when a titanium/aluminum ratio of approximately 1:9 to 1:17 is employed, the cis-1,4 content is appreciably higher. It is also to be observed that the 1,2 content of the polymer is unchanged irrespective of the titanium to aluminum ratio.

EXAMPLE V

The marked proclivity which the iodine type catalysts of the invention have for polymerizing butadiene is demonstrated by the following experiment in which the butadiene is present in the reaction mixture together with an olefin.

In this experiment, in which 378 grams of butene-1; 186 grams of benzene; 100 grams of butadiene; 0.72 gram of triisobutyl aluminum; 0.34 gram of iodine; and 0.064 gram of titanium tetrachloride are combined in the reaction mixture, polymerization is carried out at a temperature of from about 5° to 10° C. for 4.5 hours. Polybutadiene is produced at a 95% yield which contains 92% of the cis-1,4 polymer, 4.5% of the trans-1,4 type, and only 3.4% of the 1,2 polymer. The product has an inherent viscosity of 2.07, a Mooney Viscosity (M1–4–212° F.) of 40, and infra red examination of the polymer shows no trace of butene-1 having either homopolymerized or copolymerized with the butadiene.

The polymer of this example is subsequently mixed on a rubber mill and incorporated with the following ingredients:

Material: Parts per weight
- Polybutadiene _____ 100.0
- Stearic acid _____ 3.0
- Zinc oxide _____ 5.0
- HAF carbon black _____ 45.0
- Lecithin/triethylamine—95%/5% _____ 1.5
- Sundex 53—an aromatic petroleum oil mfd. by the Sun Oil Co. _____ 5.0
- Altax accelerator _____ 0.6
- Sulphur _____ 2.0

The resulting composition, which is of a type commonly used for automobile tire carcasses, is vulcanized at 284° F. to produce a vulcanizate having the following properties:

Property: Value
- Compounded Mooney Viscosity (ML–10–212° F.) _____ 68
- Tensile strength _____ lbs./sq. in. _____ 3080
- 300% modulus _____ lbs./sq. in. _____ 1100
- Percent elongation _____ 530
- Hot tensile strength (212° F.) _____ lbs./sq. in. _____ 1290
- Heat rise (Goodrich Flexometer-ASTM No. D 623), 55 lbs. at 212° F. _____ F _____ 51
- Abrasion index[1] _____ 221
- Abrasion index, natural rubber control _____ 80

[1] Method outlined in "Rubber Chemistry and Technology," first quarter, 1961.

EXAMPLE VI

The reaction mixture of this experiment consists of 200 milliliters of benzene; 0.106 gram of triethyl aluminum; 0.078 gram of iodine; 0.0085 gram of titanium tetrachloride; and 20 grams of butadiene-1,3. Except for the temperature of the reaction, which is controlled at about 25° C. the procedure followed is substantially the same as that employed in Example I, and a 100% yield of a rubbery polybutadiene having an inherent viscosity of 3.28 is obtained by the procedure. The resulting polymer has a structure in which 94.6% of the monomeric butadiene units are joined cis-1,4 1.5% trans-1,4; and 3.9% of the product is of the 1,2 type.

EXAMPLE VII

In this experiment, a batch process is employed in which 15 grams of butadiene are polymerized in a reaction mixture which also includes 200 milliliters of benzene; 0.089 gram of iodine; 0.034 gram of titanium tetrachloride; and 0.15 gram of diethyl aluminum dihydride. The polymerization is carried out in a reactor maintained under an inert atmosphere, at a temperature of about 25° C. The reaction produces approximately 14 grams of a polybutadiene product having a cis-1,4 content of 96.9%; a trans structure amounting to 0.7%; and about 2.4% of the 1,2 polymer. In view of its high cis content, a polymer of this type is a valuable article of commerce and, consequently, can be used in a wide variety of applications both industrial and domestic.

EXAMPLE VIII

In this illustration, iodine compounds other than free-iodine are investigated to determine their suitability as an iodine source for the purpose of the invention. Three experiments are run, each utilizing a different material as the source of catalytic iodine. The results are compared in the following table:

| Material | A | B | C |
| --- | --- | --- | --- |
| Triisobutyl aluminum (gram millimoles) | 5.4 | 4.7 | 3.2 |
| Iodine (gram millimole) | 1.2 | | |
| CH₂I₂ (gram millimoles) | | 5.9 | |
| CH₃I (gram millimoles) | | | 2.9 |
| TiCl₄ (gram millimoles) | 0.23 | 0.23 | 0.23 |

| Polymer structure | A | B | C |
| --- | --- | --- | --- |
| Cis-1,4 | 92 | 90.3 | 90.6 |
| Trans-1,4 | 4.1 | 5.9 | 5.5 |
| 1,2 | 3.9 | 3.8 | 3.9 |
| Yield, gm | 22.4 | 23.7 | 9.7 |

EXAMPLE IX

In a further experment, a twelve-ounce beverage bottle is carefully cleaned and dried, following which it is purged with nitrogen and charged with 200 milliliters of benzene. The bottle is then closed with a puncturable, self-sealing cap and charged with the balance of the polymerization components as follows.

First added is 0.27 gram millimole of diisobutylaluminum iodide, introduced by means of a hypodermic syringe as 0.6 milliliter of a benzene solution of the iodide. Following such addition, 0.043 gram millimole of titanium tetrachloride is introduced, also by means of a syringe as 0.5 milliliter of benzene solution of the chloride. About 24 grams of butadiene-1,3 are then pressured into the bottle, and the reaction is thereafter initiated by introduction of 0.64 gram millimole of triisobutylaluminum, added as 1.8 milliliters of a benzene solution of the compound.

Following preparation of the reaction mixture as aforesaid, the bottle is placed in a 20° C. constant temperature bath where it is rotated throughout the polymerization period, approximately sixteen hours. Following such period, the reaction is terminated by the addition of alcohol through the cap; the bottle is unsealed and its contents are added to additional alcohol to precipitate the polymer formed.

The polybutadiene thereby recovered is dried in an oven and then analyzed. Analysis indicates that of the 23 grams of polymer produced, 90.6% is cis-1,4 polybutadiene, 5.7% trans-1,4 polybutadiene, and only 3.7% 1,2 polymer.

EXAMPLE X

An additional experiment is carried out in which, again, a twelve-ounce bottle is carefully cleaned, dried and purged with nitrogen before being charged with 200 milliliters of benzene. Thereafter, 0.11 gram millimole of aluminum triiodide is added, and the bottle is closed with a puncturable, self-sealing cap.

Following the foregoing, 0.23 gram millimole of triisobutylaluminum is added with a hypodermic syringe through the self-sealing cap as a solution of the aluminum compound in benzene. Next 0.44 gram millimole of titanium tetrachloride is added by means of the syringe, also as a benzene solution of the chloride. Subsequently, 24 grams of 1,3-butadiene is pressured into the bottle, and a final portion of triisobutylaluminum, 0.55 gram millimole, is added with the hypodermic syringe.

The reaction thus initiated is carried out in a 20° C. constant temperature bath for a period of approximately 18 hours at which time the reaction is terminated with alcohol and the polymer precipitated in the manner of the preceding example. The polymer recovered amounts to 23 grams which, upon analysis, proves to have 93% of the cis-1,4 structure, 3.5 of the trans-1,4 structure and 3.5 of the 1,2 polymer.

EXAMPLE XI

In this experiment, to a twelve-ounce polymerization bottle previously cleaned, dried and purged with nitrogen, are added 200 milliliters of benzene, and the bottle is closed with a puncturable, self-sealing cap.

Next, approximately 0.17 gram millimole of triisobutylaluminum in the form of a benzene solution is added by means of hypodermic syringe, followed by 0.17 gram millimole of isobutylaluminum diiodide, also added with a syringe as a benzene solution. Thereafter, 0.044 gram millimole of titanium tetrachloride, as a benzene solution, is added with the syringe, followed by 24 grams of 1,3-butadiene, and finally, 0.55 gram millimole of a benzene solution of triisobutylaluminum.

The reaction thus initiated is carried on in a 20° C. constant temperature polymerization bath for a period of about 18 hours; the polymerization bottle being rotated throughout the reaction period.

Following polymerization as aforesaid, the reaction mixture is inactivated through the addition of methanol and the contents of the bottle discharged into methanol to precipitate the polymer. The polymer thus obtained is dried in an air oven and analyzed with the following results.

Of the approximately 23 grams of polymer obtained, 91.1% displays a cis-1,4 structure, 4.5% a trans-1,4 structure and 3.6% a 1,2 configuration.

In view of the uniformly high cis product, it is apparent that the character of the iodine source necessary for the catalysts of the invention is relatively unimportant, and a wide variety of substances are suitable for the purpose.

The process of the invention, when used in a manner similar to that described, produces polymeric butadiene having relatively high molecular weights—as is indicated by their inherent viscosities. The materials formed are rubbery substances, containing little or no gel material, and possessing a structure in which at least about 95% of the monomeric butadiene units are joined in a 1,4 structure. While polybutadienes may be formed by the process which have a cis-1,4 content of at least about 80%, under the preferred conditions of the process, such polymers contain from about 90 to 97% of the butadiene units joined in the cis-1,4 configuration. Because of the low internal friction, and consequential minimal heat generation, and in view of the inherent high abrasion resistance of the polymers, polymeric butadiene of the type disclosed have considerable potential in various commercial applications such as, for example, in the manufacture of tires. While the materials are particularly suited for use in tire treads, when they are blended with from about 10 to 90% by weight of natural or synthetic natural rubbers, excellent carcass-type compounds result.

What is claimed is:

1. A process for polymerizing monomeric butadiene-1,3 to form a polymer having a relatively high cis-1,4 structure comprising conducting the polymerization in the presence of a catalyst comprised of aluminum iodide compounds of the formula $R_xAlI_{3-x}$ where R is a hydrocarbon group and $x$ is a number 1 through 2; titanium tetrachloride and an alkyl aluminum compound having the general formula $R_2AlR'$ where R' is a hydrocarbon radical and R is selected from the group consisting of R' and hydrogen, the catalyst components being present in quantities such that the number of moles of alkyl aluminum compound in the catalyst is at least about three times the moles of titanium tetrachloride present, as well as at least slightly in excess of the moles of aluminum iodide, and the moles of aluminum iodide are at least about double the moles of titanium tetrachloride in said catalyst.

2. A process for polymerizing monomeric butadiene-1,3 to form a polymer having a relatively high cis-1,4 structure comprising conducting the polymerization in a catalyst-solubilizing inert hydrocarbon medium in the presence of a catalyst comprised of an aluminum iodide compound of the formula $R_xAlI_{3-x}$ where R is an alkyl compound and $x$ is a number 1 through 2; titanium tetrachloride and an alkyl aluminum compound having the general formula $R_2AlR'$ where R' is a hydrocarbon radical and R is selected from the group consisting of R' and hydrogen, said alkyl aluminum compound being employed in an amount such that at least about 0.005 gram millimole is present for every 100 grams of butadiene present and the other catalyst components being in quantities such that the number of moles of alkyl aluminum compound in the catalyst is at least about three times the moles of titanium tetrachloride present, as well as at least slightly in excess of the moles of aluminum iodide, and the moles of aluminum iodide are at least about double the moles of titanium tetrachloride in said catalyst.

3. A process for polymerizing monomeric butadiene-1,3 to form a relatively high cis-1,4 structure comprising conducting the polymerization at a temperature of no more than about 50° C. in an inert hydrocarbon polymerization medium in the presence of a catalyst comprised of an aluminum iodide compound of the formula $R_xAlR_{3-x}$ where R is a hydrocarbon group and $x$ is a number 1 through 2; titanium tetrachloride and an alkyl aluminum compound having the general formula $R_2AlR'$ where R' is a hydrocarbon radical and R is selected from the group consisting of R' and hydrogen, said alkyl aluminum compound being employed in an amount such that about between 0.02 and about 10 grams millimoles is present for every 100 grams of butadiene present, and the other catalyst components being in quantities such that the number of moles of alkyl aluminum compound in the catalyst is at least about three times the moles of titanium tetrachloride present, as well as at least slightly in excess of the moles of aluminum iodide, and the moles of aluminum iodide are at least about double the moles of titanium halide in said catalyst.

4. A catalyst composition for polymerizing monomeric butadiene-1,3 to a polymer having a relatively high cis-1,4 structure comprised of a compound of the formula $R_xAlI_{3-x}$ where R is a hydrocarbon group and $x$ is a number 1 through 2; titanium tetrachloride and an alkyl aluminum compound of the general formula $R_2AlR'$ where R' is a hydrocarbon radical and R is selected from the group consisting of R', hydrogen atoms and halogen atoms, the catalyst components being present in quantities such that the number of moles of alkyl aluminum compound in the catalyst is at least about three times the moles of titanium tetrachloride present as well as at least slightly in excess of the moles of aluminum iodide, and the moles of aluminum iodide are at least about double the moles of titanium tetrachloride in said catalyst.

5. A process for preparing a rubbery polybutadiene containing in the range of 85 to 98 percent cis-1,4 addition which comprises contacting 1,3-butadiene with a catalyst system which forms on mixing (1) an organometal having the formula $R_nM$ where R is alkyl, each R group containing up to and including 8 carbon atoms, M is aluminum, and $n$ is an integer equal to the valence of metal M, (2) titanium tetrachloride and (3) an organometal iodide of the formula $R_xM'_yI_z$ wherein R is an organic radical as hereinbefore defined, M' is aluminum, I is iodine, $x$ and $z$ are integers, $x$ being 2 and $z$ being 1, and $y$ is 1 and $x+z$ equals the valence of metal M', the mole ratio of the $R_nAl$ compound to said titanium tetrachloride being in the range of 3:1 to 20:1, the mole ratio of said titanium tetrachloride to said organometal iodide compound being in the ratio of 0.05:1 to 0.5:1, said contacting occurring in the presence of a hydrocarbon diluent at a temperature range of $-10$ to $50°$ C. and under autogenous pressure; and recovering the rubbery cis-polybutadiene so produced.

6. A process according to claim 1 in which the polymerization is carried out in an inert polymerization medium.

7. A process according to claim 2 in which the polymerization is conducted at a temperature no higher than about 50° C.

8. A process according to claim 3 wherein following said polymerization the catalyst is deactivated; the polymeric product separated from said inert hydrocarbon polymerization medium; the catalyst residues substantially removed from the polymeric product; and the polymeric product dried to produce a valuable article of commerce.

9. A process according to claim 8 in which an antioxidant is incorporated in said polymeric product prior to the separation of said product from the inert hydrocarbon polymerization medium.

References Cited

UNITED STATES PATENTS

| | | | |
|---|---|---|---|
| 3,245,975 | 4/1966 | Zelinski | 260—94.3 |
| 3,205,213 | 9/1965 | Stearns et al. | 260—94.3 |
| 3,222,347 | 12/1965 | Farrar et al. | 260—94.3 |
| 3,172,881 | 3/1965 | Farrar et al. | 260—94.3 |

FOREIGN PATENTS

| | | |
|---|---|---|
| 841,324 | 7/1960 | Great Britain. |
| 591,994 | 12/1960 | Belgium. |

OTHER REFERENCES

Gippin, ACS Preprints, vol. 6, No. 4. September 1961, pp. A-25 to A-42, pp. A-25 relied on TP 690 ALA5a.

JOSEPH L. SCHOFER, *Primary Examiner.*

R. A. GAITHER, *Assistant Examiner.*